May 24, 1955 R. W. SPAFFORD 2,709,237
SINGLE PHASE INDUCTION MOTOR REVERSING CONTROL
Filed Nov. 9, 1953
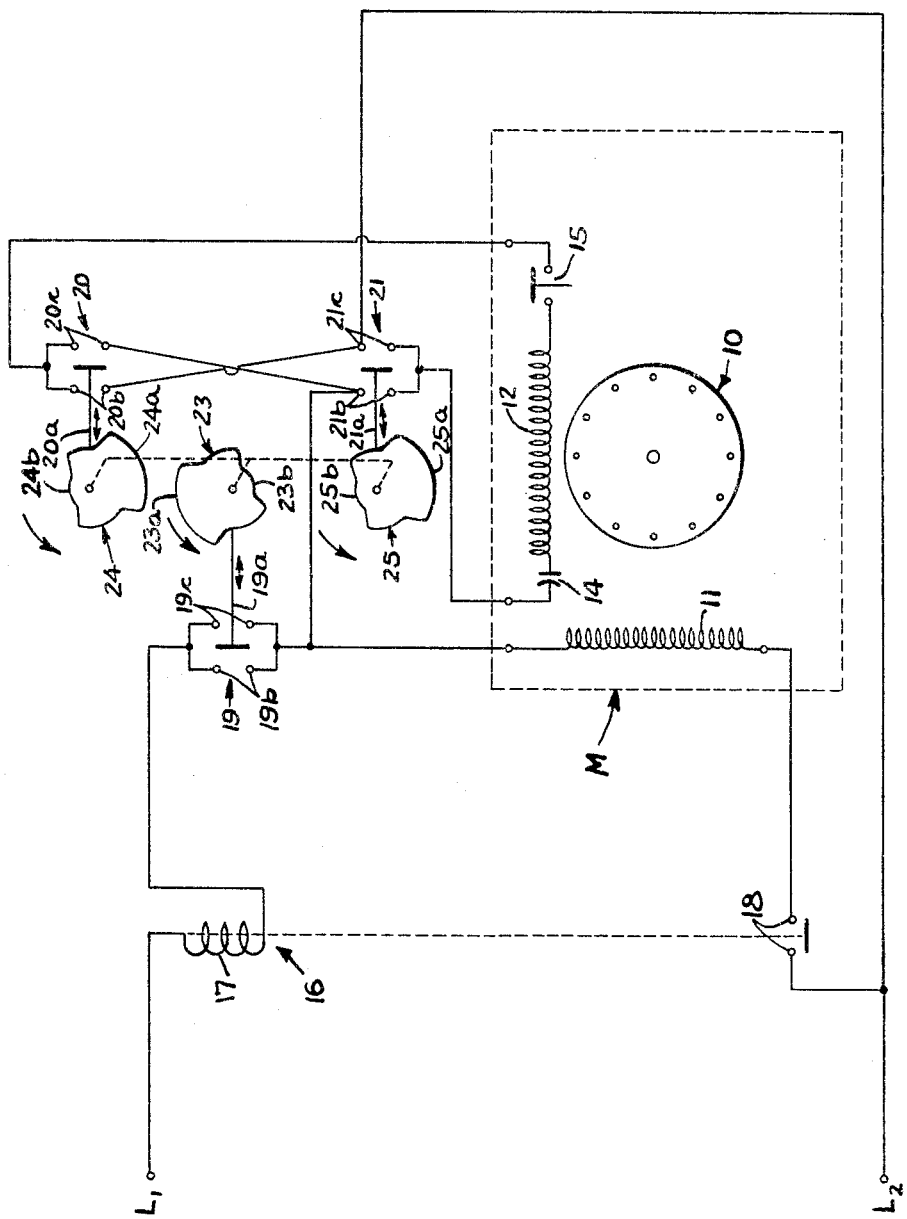
Inventor
RALPH W. SPAFFORD
By Carlson, Pitzner, Hubbard & Wolfe
Attys.

United States Patent Office 2,709,237
Patented May 24, 1955

2,709,237

SINGLE PHASE INDUCTION MOTOR REVERSING CONTROL

Ralph W. Spafford, Euclid, Ohio, assignor, by mesne assignments, to Philco Corporation, Philadelphia, Pa., a corporation of Pennsylvania Application November 9, 1953, Serial No. 391,094

3 Claims. (Cl. 318—207)

The present invention relates to motors and motor controls and, more particularly, to the reversing control of single phase induction motors.

It is the general aim of the invention to provide for improvements in reversing controls of the type indicated, affording on the one hand, the quick and positive reversing of a single phase induction motor and, on the other hand, absolute protection of the motor windings against possible damage by improper energization.

In a more specific aspect, it is an object of the invention to provide such motor reversing control employing three switches, two being of the double throw type, which are opened and reclosed to reverse the motor, the control being characterized by a safety feature assuring that if for any reason one of the switches fails to close, neither of the motor windings can be energized.

A further object of the invention is the provision of a motor reversing control which need not include a supply line disconnect switch, but in which the control switches completely disconnect the motor windings from the supply line when opened to stop the motor. This prevents damage to the windings while the motor is at rest in the event that one of the windings has become grounded.

Other objects and advantages will become apparent as the following description proceeds, taken in conjunction with the accompanying drawings in which the single figure is a schematic circuit diagram of a motor and reversing control embodying the features of the present invention.

While the invention has been illustrated and is described in some detail with reference to a particular embodiment, there is no intention that it thus be limited to such detail. On the contrary, it is intended here to cover all modifications, alterations, and equivalents falling within the spirit and scope of the invention as defined by the appended claims.

Referring now to the exemplary embodiment of the invention here shown, a well-known form of single phase induction motor M is schematically illustrated. The motor M is of the well-known split phase, capacitor-start type, in this instance, and includes a rotor 10 which is positioned to be linked by a magnetic flux created by a running winding 11 when the latter is energized. An auxiliary or starting winding 12 is displaced physically from the winding 11 and connected in series with a capacitor 14 and a centrifugal switch 15. The latter is normally closed and is driven by the rotor 10 to be opened when the motor has been brought up to a predetermined speed.

Such a motor M will rotate in either direction when only the running winding 11 is energized, the direction of such rotation beind dependent upon the direction in which the rotor is first started. The running winding 11, however, is not alone capable of initiating rotation of the motor and, for this purpose, the starting winding 12 is provided, together with the centrifugal switch 15 which disconnects it after the motor has reached a predetermined speed and will run solely from the running winding 11. To start the motor, then, it is necessary that both the windings 11 and 12 be energized; and the direction of rotation for the motor 10 depends upon the relative polarities of the two windings 11 and 12. In order to reverse the direction of motor rotation, the connections, that is, the sense of current, for the starting winding 12 need only be reversed. However, it becomes necessary that the motor be slowed sufficiently for the centrifugal switch 15 to again close before such reversal can take effect.

The foregoing characteristics of single phase induction motors are well known, and it has been previously proposed that double throw switches be employed in order to afford reversal of connections for either the starting winding or the running winding, to thereby effect rotational reversal. However, such prior proposals have had the disadvantage that if in reversing the connections, one of the switches fails to reclose, then one of the windings would be energized, but not the other. Since both windings must be energized to initiate rotation of the rotor, the motor would not start under such conditions and the one energized winding would carry a heavy starting current for a long period of time, if the situation were not promptly detected and corrected, likely to burn out or seriously damage that winding.

For example, the single phase induction motors employed to drive many types of automatic washing machines must be frequently and quickly reversed in completing a washing program of various operations. Such machines are usually started and left without attention until the washing program is complete, reliance being placed upon timed automatic controls to reverse the motor after proper periods have elapsed for certain ones of the program operations. In one form of automatic control, a timer may be employed which has a rotated cam bank and wherein the cams actuate switches which control the reversal of the motor.

While the cam-operated switches are intended to simultaneously and positively reverse the connections, it may be that one or more might fail to close or make contact. It is neither desirable nor practical from an economic standpoint to provide time delay overload protective devices. Since the machine is to be left unattended, it becomes necessary to provide a control which will not only quickly and positively reverse the motor without requiring some timing device which waits until the rotor stops moving in its original direction, but which also gives assurance, without extra protective devices, that should one cam-operated switch fail to close, no damage to the motor can result.

It is to this accomplishment that the present invention is directed.

In keeping with the present invention, a reversing control circuit comprises a current relay 16 having an energizing coil 17 and normally open contacts 18. Connections are provided for placing the coil 17 in series relation with a first switch 19, the running winding 11, and the contacts 18, and for adapting such series connected components to be energized from a suitable voltage source here shown as supply lines $L_1$ and $L_2$.

For connecting the starting winding 12 to be energized in either of two senses, second and third switches 20 and 21, which are of the double throw type, are provided, together with means including such switches for placing the series combination of the winding 12, centrifugal switch 15, and capacitor 14 in parallel across the winding 11 and contacts 18. More specifically, the switches 20 and 21 are connected with the winding 12 to reversibly connect the latter to the supply lines $L_1$ and $L_2$ but through the coil 17 and the switch 19, as well as through the centrifugal switch 15. It will be seen from the circuit diagram that when movable elements 20a and 21a of switches 20 and 21 are moved to connect the right contact points 20c and 21c, the centrifugal switch 15 is connected to the top end of winding 11, while the capacitor 14 is connected directly to line L₂. On the other hand, when the movable elements 20a and 21a bridge the left contacts 20b and 20c of switches 20 and 21, the centrifugal switch 15 is connected directly to the line L₂ and the capacitor 14 connected directly to the top end of winding 11. Thus in either case, the starting winding 12 and its centrifugal switch 15 are connected in parallel with the series combination of the running winding 11 and relays contacts 18, but in reversed senses.

While the switch 19 has been illustrated as of the double throw type, it is shown thus only to indicate that it may be one of several identical switches, such as the other switches 20 and 21, assembled as a unit. However since the contacts on opposite sides are connected together as shown, it will be clear that switch 19 may be of the single throw or open-close type.

In the present instance, the movable elements of the three switches 19, 20 and 21 are shown actuated by cams 23, 24 and 25, respectively. These cams may be ganged in a bank on a single shaft and form a part of a timing mechanism of any suitable organization. The cams are provided with raised portions 23a, 24a and 25a which cause the movable element 19a to bridge the left contacts 19b of switch 19 and movable elements 20a and 21a to bridge the right contacts 20c and 21c of switches 20 and 21, respectively. In a similar manner, the cams have reduced portions 23b, 24b and 25b which permit the corresponding movable elements to bridge the opposite contacts 19c, 20b, and 21b of their respective switches 19, 20 and 21.

The operation of the control circuit in reversing the motor M may be briefly described as follows. With the three switches 19, 20 and 21 in their centered or open positions, as shown, it will be apparent that the contacts 18 are opened since no current flows through the coil 17. Accordingly, both the running winding 11 and starting winding 12 are disconnected at both of their extremities from either of the supply lines L₁ and L₂. Thus when the motor is stopped, its two windings 11 and 12 are fully "floating" and completely isolated from the voltage source even though no separate disconnect switch is employed. As a result, should one of the windings 11 or 12 become wet and grounded in standing for a long period of time, for example, no current could flow through the ground connection and thereby damage the windings or the insulation on them.

To start the motor in a first direction, the cams 23, 24 and 25 are rotated to close all three of the switches, say, the raised portions 23a, 24a and 25a translate their corresponding movable elements 19a—21a to bridge the left contacts 19b of switch 19 and the right contacts 20c and 21c of switches 20 and 21. No current initially flows through the running winding 11 since the contacts 18 are open. However, current may flow from the line L₁ through the coil 17, switch 19, and switch 20, through the centrifugal switch 15, winding 12 and capacitor 14 to switch contacts 21c, and thence to line L₂. This energizes both the starting winding 12 and the coil 17, picking up the contacts 18 which in turn energize the running winding 11. The motor then begins to rotate and pick up speed until such time that the centrifugal switch 15 opens. The running winding 11 alone then serves to effect rotation of the rotor 10. The current flowing through the running winding 11 serves to maintain the coil 17 energized and the contacts 18 closed.

When it is desired to reverse the direction of rotation for the rotor 10, the cams 23—25 in cooperating at the reduced portions 23b—25b with the movable elements 19a—21a, respectively, permit the latter to move to their neutral positions illustrated and thence to bridge the opposite contacts, i. e., the right contacts 19c of switch 19, and the left contacts 20b and 21b of the switches 20 and 21. When the original contact at switch 19 was broken, coil 17 was de-energized and the contacts 18 opened. When the three switches 19 through 21 are then again closed, the starting winding 12 is energized in an opposite sense as soon as the rotor slows sufficiently for the centrifugal switch 15 to reclose. It is not necessary to wait until the rotor 10 has stopped or until it has slowed to any predetermined speed before the three switches 19 through 21 can be reclosed. However, when the centrifugal switch recloses the winding 12 is again energized in an opposite sense due to the reversal of the double throw switches 20 and 21. Current flows through the switch 19 and the starting winding 12, energizing that winding as well as the coil 17 which picks up the contacts 18. Both the windings 11 and 12 are thus again energized and the rotor 10 is brought to a stop (i. e., "plugged") and restarted in the opposite direction. When the rotor reaches a predetermined speed the centrifugal switch 15 again opens, leaving the motor operating solely on the running winding 11 with the contacts 18 sealed closed by the current flowing through coil 17, switch 19 and the running winding 11.

It is to be particularly noticed that should any one of the three switches 19 through 21 fail to make contact, neither of the windings is energized, even though the centrifugal switch 15 is closed. Since the motor will not start until both the windings 11 and 12 are energized, the energization of one without the other may result in a prolonged current flow in one winding which might damage the conductor or the insulation on it. In more detail, if switch 19 fails to close, of course, no voltage is supplied to any of the winding terminals. If the switch 20 fails to close, even though switch 21 closes, the circuit for the winding 12 is not complete so that no current flows to energize that winding or to energize the coil 17 and to pick up the contacts 18. Therefore the running winding 11 also remains unenergized. The same holds true if switch 21 fails to close while switch 20 operates properly.

As mentioned above, such a safety feature is particularly important when the motor and its control circuit are employed, for example, in an automatic washing machine having a timing cam bank such as that represented by the cams 23 through 25 for periodically reversing the rotational direction of the motor. There is a chance that the three switches 19 through 21 will not close simultaneously or that one may completely fail to close while the others make contact. While the invention and its safety characteristics are advantageously applied in numerous installations, the particular case of an automatic washing machine which usually employs cam-actuated switches as illustrated, requires that the motor be protected should one of the switches fail as described.

I claim as my invention:

1. The combination with a single phase induction motor having a running winding, a starting winding, and a normally closed centrifugal switch which is opened when the motor reaches a predetermined speed; of a reversing control circuit for said motor comprising a current relay having an energizing coil and normally open contacts; a first cam-operated switch; means connecting said coil, first switch, running winding and contacts in series relation and adapting them for connection to a voltage source; second and third cam-operated double throw switches; means connecting said starting winding and centrifugal switch in series relation; and means including said second and third switches for reversibly connecting said series-connected starting winding and centrifugal switch in parallel relation across said running winding and contacts; whereby opening and opposite closing of said first, second, and third switches reverses the direction of rotation of the motor when the second and third switches are thrown in the opposite sense, yet failure of any of said switches to close prevents energization of either of said windings.

2. The combination with a single phase induction motor having a running winding, a starting winding, and a normally closed centrifugal switch which is opened when the motor reaches a predetermined speed; of a reversing control circuit for said motor comprising a current relay having an energizing coil and normally open contacts; a first switch; means connecting said coil, first switch, running winding and said contacts in series relation in the order named and adapting them for connection to a voltage source; second and third double-throw switches; means connecting said starting winding and centrifugal switch in series relation; and means including said second and third switches for reversibly connecting said starting winding and centrifugal switch across said running winding and said contacts; whereby all three of said switches must be closed before either of said windings is energized, and neither end of either of said windings is connected to said voltage source when all three of said switches are open.

3. A reversing control for a single phase induction motor having a running winding, a starting winding, and a normally closed centrifugal switch; said control being adapted to energize said motor for reversible rotation from a voltage source and comprising, in combination, means including a first switch for connecting said running winding in series circuit with said source, means including said first switch and second and third double-throw switches for connecting said starting winding and centrifugal switch in series reversibly for energization from said source, and means including a relay for preventing the energization of said running winding until said starting winding is first energized, said relay having normally open contacts in series with said running winding and an energizing coil in series with both the running and starting winding circuits such that said contacts are not closed until all three of said switches and said centrifugal switch are closed but remain closed until said first switch is opened.

References Cited in the file of this patent

UNITED STATES PATENTS

| | | |
|---|---|---|
| 1,316,009 | Weber | Sept. 16, 1919 |
| 1,576,276 | Hedges et al. | Mar. 9, 1926 |
| 2,285,687 | Snyder | June 9, 1942 |
| 2,320,176 | Dunham et al. | May 25, 1943 |
| 2,459,479 | Weinland | Jan. 18, 1949 |
| 2,511,315 | Adamek | June 13, 1950 |
| 2,594,657 | Koonz | Apr. 29, 1952 |
| 2,594,658 | Koonz | Apr. 29, 1952 |